B. C. BROWN.
MACHINE FOR SAWING SHINGLES.
No. 190,703. Patented May 15, 1877.
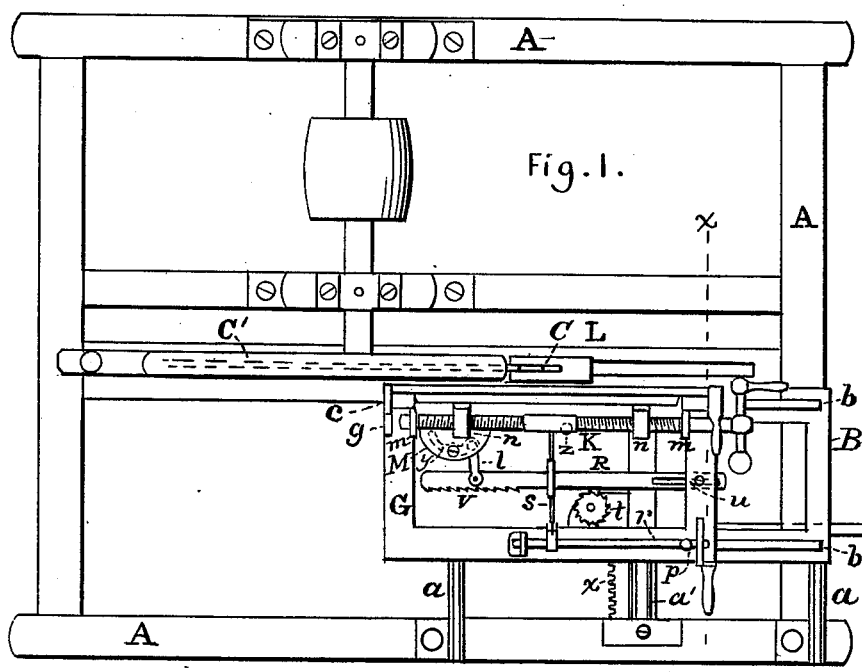
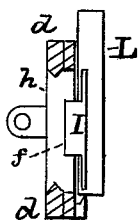
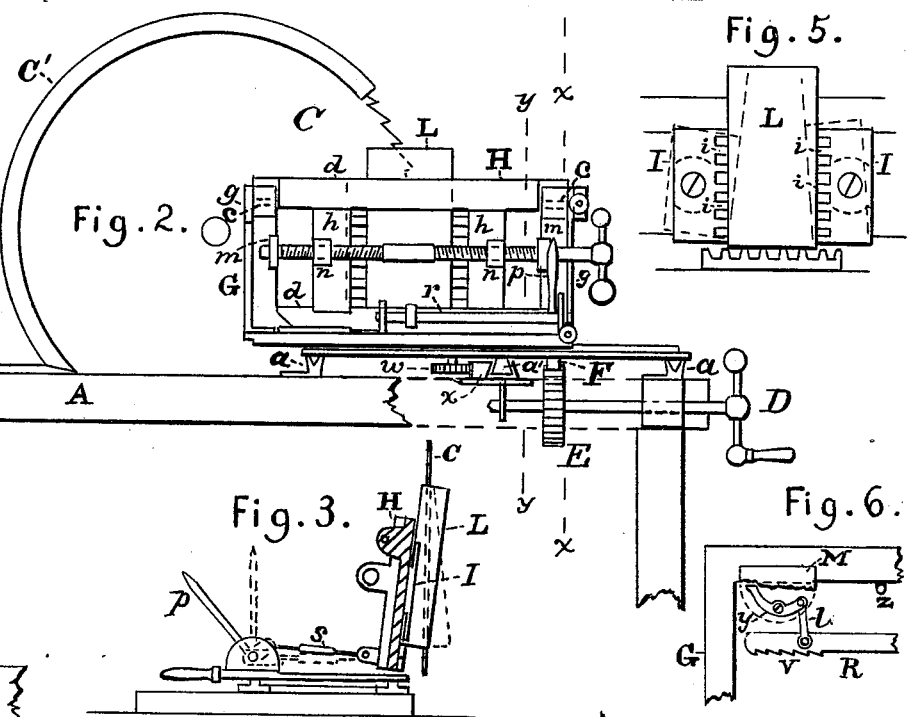
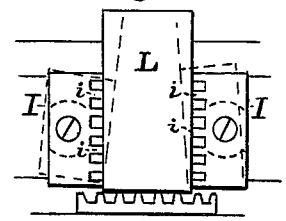
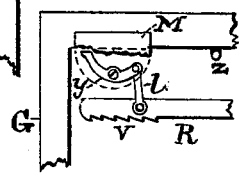
Witnesses:
R. S. Lacey
A. T. Lacey
Inventor:
Byron C. Brown
by W. Burris
Attorney.

UNITED STATES PATENT OFFICE.

BYRON C. BROWN, OF CLINTON, IOWA.

IMPROVEMENT IN MACHINES FOR SAWING SHINGLES.

Specification forming part of Letters Patent No. 190,703, dated May 15, 1877; application filed February 10, 1877.

*To all whom it may concern:*

Be it known that I, BYRON COFRON BROWN, of Clinton City, in the county of Clinton and State of Iowa, have invented certain new and useful Improvements in Machines for Sawing Shingles; and I do hereby declare that the following is a full, clear, and exact description thereof, which will enable others skilled in the art to which it appertains to make and use the same, reference being had to the accompanying drawings, and to letters of reference marked thereon, which form a part of this specification, in which drawings—

Figure 1 is a plan view of my invention. Fig. 2 is a side elevation of the same. Fig. 3 is a vertical section taken on the line $x\ x$ of Figs. 1 and 2. Fig. 4 is a vertical section on line $y\ y$ of Fig. 2. Fig. 5 is a face view of the dogs holding a block of timber. Fig. 6 is a plan view of part of the carriage G and its connections detached.

My invention relates to machines for the manufacture of shingles, and consists in certain improvements in the construction of the same, as hereinafter described and shown.

In the drawing, A designates the frame supporting the machine, to the top of which frame are fixed the guides $a$, upon which the carriage B is moved forward and backward to and from the face of the saw C by means of a crank, D, and pinion E, the latter engaging with a rack, F, fixed to the under side of the carriage. A guard, C', for the saw is fixed to to the frame A, as shown. The carriage B is provided with the ways $b$, the same running at right angles to the guides $a$. It is also provided with a dovetailed guide, $a^1$, fixed to its lower side and running in a way, $a^2$, for holding the carriage in position. Upon the ways $b$, another carriage, G, is placed, which may be moved with the carriage B, or endwise, on the ways $b$. The carriage G is provided with the uprights $g$, between which is hung a frame, H, the same being pivoted at $c$, and the upper and lower bars $d$ of which are formed with ways for the sliding pieces $h$ to move between them. (See Fig. 4.) The dogs I have teeth $i$, and are secured to the sliding pieces $h$, on the sides toward the saw, by means of screws, and are adjustable in position by means of recesses $f$ in the parts $h$, the recesses being somewhat circular, and the dogs having projections fitting in them so as to be placed in an upright or an inclined position, according to the shape of the timber to be held, thus rendering the dogs adjustable to the form of a block, whether it is square or tapering.

The dogs are operated by means of a bar, K, provided with right and left screw threads and passing through corresponding nuts $n$ on the pieces $h$, the bar having bearings $m$ on the frame H.

To cut the shingle in proper shape with butt and thin ends, a lever, $p$, is fixed to a rock-shaft, $r$, having bearings on the carriage G, and connecting with frame H by connecting-rod $s$, so that by a movement of the lever $p$ the frame H with block L is brought to an inclined position, as shown in Fig. 3, the saw cutting the block at the proper angle. A reverse movement of lever P swings the frame and block in the opposite direction, so that the shingles are cut alternately, one with the thin end upward, and the next with the thin end downward.

The feeding movement of the block L to the saw is effected as follows: The bar R, made adjustable longitudinally by the slot and screw $u$, is provided with teeth V to engage with the ratchet-wheel $t$. Directly below, and moving with wheel $t$, is a pinion, $w$, which gears into a rack, $x$, and the plate M, fastened to the carriage G, has pivoted to the under side thereof a curved lever, $y$, one end of which connects with bar R by means of the connecting-rod $l$. As the carriage G is moved backward, the bar R, being properly adjusted, engages with ratchet-wheel $t$, turning it and giving motion to pinion $w$, which engages with rack $x$, the latter being fixed to frame A, and as the pinion $w$ is turned the carriage B to which it is secured moves toward the saw. At a proper point a pin, $z$, engages with lever $y$ and moves the bar R out of gear, so that the movement of the carriage B is stopped at the required point for cutting the proper thickness of the shingle.

Having described my invention, I claim—

1. The frame H, hung to the standards $g$, on carriages G, in combination with slide-blocks $h$, carrying the dogs I, substantially as and for the purposes described.

2. The dogs I, pivoted in recesses to the slide-blocks $h$, in the swinging frame H, in combination with the adjusting-bar K, substantially as and for the purposes described.

3. In combination with the carriages B C, the swinging frame H, pivoted dogs I, and adjusting-bar K, all constructed and operating as shown and described.

4. The feeding devices, consisting of the combination of the adjustable bar R, having teeth $v$, lever $y$, on plate $m$, connected with the bar by a rod, $l$, wheel $t$, pinion $w$, and rack $x$, substantially as shown and described.

In testimony that I claim the foregoing as my own invention, I affix my signature in presence of two witnesses.

BYRON COFRON BROWN.

Witnesses:
WM. W. SANBORN,
WILLIAM LAKE.